(12) United States Patent
Shum et al.

(10) Patent No.: US 6,469,710 B1
(45) Date of Patent: Oct. 22, 2002

(54) INVERSE TEXTURE MAPPING USING WEIGHTED PYRAMID BLENDING

(75) Inventors: Heung-Yeung Shum; Richard S. Szeliski, both of Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/160,311

(22) Filed: Sep. 25, 1998

(51) Int. Cl.$^7$ .............................. G09G 5/00; G06K 9/36
(52) U.S. Cl. ...................... 345/619; 345/629; 382/284
(58) Field of Search ................... 345/435, 619, 345/629, 620, 635; 382/284

(56) References Cited

U.S. PATENT DOCUMENTS

| | | | |
|---|---|---|---|
| 5,488,674 A | * | 1/1996 | Burt et al. .................. 345/435 |
| 6,075,905 A | * | 6/2000 | Herman et al. ............. 382/284 |
| 6,088,470 A | * | 7/2000 | Camus et al. .............. 382/117 |
| 6,097,854 A | * | 8/2000 | Szeliski et al. ............. 382/284 |
| 6,128,108 A | * | 10/2000 | Teo ............................ 358/540 |
| 6,038,031 A1 | * | 3/2001 | Murphy ..................... 382/141 |

OTHER PUBLICATIONS

Foley et al Computer Graphics: Principles and Practice Second Edition in C.*
C. Bregler, M. Covell, and M. Slaney. Video rewrite: Driving visual speech with audio. Computer Graphics (SIG-GRAPH'97), pp. 353–360, Aug. 1997.
T. Porter and T. Duff. Compositing digital images. Computer Graphics (SIG–GRAPH'84), 18(3):253–259, Jul. 1984.
A. R. Smith and J. F. Blinn. Blue screen matting. In Computer Graphics Proceedings, Annual Conference Series, pp. 259–268, Proc. SIGGRAPH'96 (New Orleans), Aug. 1996. ACM SIGGRAPH.
M. Segal, C. Korobkin, R. van Widenfelt, J. Foran, and P. Haeberli, Fast shadows and lighting effects using texture mapping. Computer Graphics (SIG–GRAPH92), pp. 249–252, Jul. 1992.

* cited by examiner

*Primary Examiner*—Jeffery Brier
*Assistant Examiner*—Anthony Blackman
(74) *Attorney, Agent, or Firm*—Lyon & Harr, LLP; Richard T. Lyon (57) ABSTRACT

A system and method for inverse texture mapping in which given a 3D model and several images from different viewpoints, a texture map is extracted for each planar surface in the 3D model. The system and method employs a unique weighted pyramid feathering scheme for blending multiple images to form the texture map, even where the images are taken from different viewpoints, at different scales, and with different exposures. This scheme also makes it possible to blend images with cut-out regions which may be present due to occlusions or moving objects. It further advantageously employs weight maps to improve the quality of the blended image.

21 Claims, 9 Drawing Sheets

(4 of 9 Drawing Sheet(s) Filed in Color)

INVERSE TEXTURE MAPPING USING WEIGHTED PYRAMID BLENDING

BACKGROUND

1. Technical Field

The invention is related to inverse texture mapping, and more particularly, to a system and process for inverse texture mapping using weighted pyramid blending.

2. Background Art

Image-based modeling and rendering has become an important and powerful method to simulate visually rich virtual environments. A traditional method to represent such an environment is to use 3D geometry with some associated texture maps. Many techniques for recovering the 3D geometry of the environment from one or more images have been developed in the photogrammetry, computer vision, and computer graphics communities. These include both automatic techniques [Fau93] and interactive techniques [DTM96].

High quality texture maps are essential for simulating visually rich natural environments. Panoramic mosaics and environment maps [Che95, M1395, and SS97] are examples of rich texture maps used with very simple geometric models (cylinders or cubes).

A number of blending algorithms have been developed to extract texture maps and/or high quality mosaics from multiple images. A general requirement for blending two images is to make the "seams" between them invisible. One common technique is to use linear or nonlinear cross-dissolving or weighted averaging [Pel81, Sze96]. However, choosing a proper cross-dissolving width is a difficult task. Burt and Adelson [BA83b] use a Laplacian pyramid to blend two images in different frequency bands with different blending widths. They can therefore blend without blurring by cross-dissolving in narrower neighborhoods in higher frequency bands, and in wider neighborhoods in lower frequency bands.

Laplacian pyramid blending works very well for splining two overlapping images (joining two images at the centerline without visible seams) and has been widely adopted (e.g., for blending facial masks with face images [BCS97]). However, it cannot be directly applied to the inverse texture mapping problem because it is not designed for images with alpha channels (visibility masks).

Images with alpha channels, typically referred to as alpha-masked images, are widely used in many applications such as image compositing [PD84, Bli94a, Bli94b] and blue-screen matting [SB96]. In the context of inverse texture mapping, images having cutouts due to occlusions, moving objects, and irregular shapes from perspective projection, must often be blended. Alpha-masking the images provides a way to handle such images with cutouts. Specifically, the pixels in the cut-out regions of the images are given zero alpha values. However, as eluded to above, current blending methods are not capable of blending alpha masked images.

In addition, when images are taken from different view points or at different scales (i.e., zoom), they will have very different spatial samplings when projected into the texture map, and therefore contribute content at different spatial frequencies. Images to be blended may also have different exposures. Before such images can be blended, a decision must be made as to how much each image (in fact, each pixel in each image) should contribute to the final, blended texture map.

Figure 1:
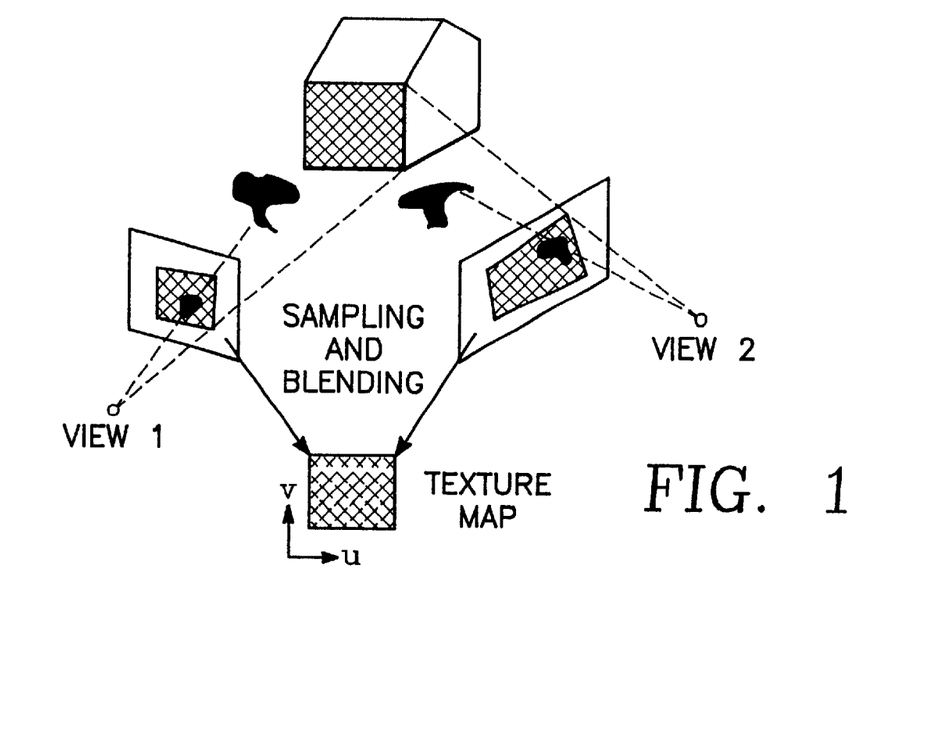
FIG. 1 is a diagram graphically depicting some of the problems associated with creating a texture map of a side of a building using two images of the building taken from different viewpoints, at different scales (i.e., zoom) and each with an intervening object causing an occlusion in the image.

FIG. 1 illustrates the two foregoing problems in inverse texture mapping. Assume it is desired to create a texture map 10 of the side wall 12 of the building 14 using two images 16, 18. However, the view of the side wall 12 captured in the first image 16 is partially occluded by a tree 20. Similarly, the view of the side wall 12 capture in the second image 18 is partially occluded by another tree 22. In order to obtain a texture map of the side wall 12, the part of the two images 16, 18 depicting the trees must be "cut-out" prior to blending. As discussed above, this can be accomplished using an alpha mask and setting those pixels associated with the trees to zero. One of the problems addressed by the present invention is how to blend images with these cut-out regions (i.e., with alpha masks). Another problem addressed by the present invention is how to blend images having different sampling rates. This is also illustrated in FIG. 1. As can be seen the view of the side wall 12 captured in the first image 16 is directly in front of the wall, whereas the view of the side wall captured in the second image 18 is off to the side of the wall. This means that the first image will provide a better sampling rate of the pixels associated with the side wall 12 than will the second image in the context of image viewpoint. However, it can also be seen that the second image 18 was captured at a greater zoom setting than the first, and so may show more detail (i.e., a higher sampling rate) of the side wall 12 in some areas. Thus, the resulting blended image would be more accurate if the contributions of corresponding pixels in the two images 16, 18 where weighted relative to their sampling rates (and degree of exposure as well) prior to blending. The issue of how to adjust the blending coefficients to account for these differences is addressed by the present invention so that optimal sampling and exposure can be maintained in the blended image.

It is noted that in the preceding paragraphs, as well as in the remainder of this specification, the description refers to various individual publications identified by an alphanumeric designator contained within a pair of brackets. For example,. such a reference may be identified by reciting, "reference [DTM96]" or simply "[DTM96]". Multiple references will be identified by a pair of brackets containing more than one designator, for example, [PD84, Bli94a, Bli94b]. A listing of the publications corresponding to each designator can be found at the end of the Detailed Description section.

SUMMARY

Given a 3D model and several images from different viewpoints, an "optimal" texture map can be extracted for each planar surface in the 3D model using an inverse texture mapping process. In particular, a unique weighted pyramid feathering process is employed that extends the traditional Laplacian pyramid blending algorithm to handle alpha masked images and take advantage of weight maps. In this way, it is possible to blend images having cut-out regions, such as those caused by occlusions or moving objects in the images. In addition, the use of a weight map associated with each input image to indicate how much each pixel should contribute to the final, blended texture map, makes it possible to create seamless texture maps.

Specifically, the present invention is embodied in a system and process for inverse texture mapping that uses the aforementioned unique weighted pyramid feathering scheme. First, at least two images of a 3D scene are inputted and any pixel located in a cut-out region of the images is set to a zero value. The 3D scene is characterized as a collection of regions (e.g., triangles). All the regions of the 3D scene which are to be texture mapped are identified in each inputted image. A 2D perspective transform for each identified planar region is then computed. This transform is capable of projecting the associated planar region to prescribed texture map coordinates. The 2D perspective transforms are used to warp each identified planar region to the prescribed texture map coordinates to create plurality of warped images. A weight map is created for each warped image. As indicated above, the weight maps specify the degree to which each pixel in a particular warped image is to contribute to the final, blended image.

The next step in the overall inverse texture mapping process is to blend the warped images using the weight maps. This generally entails forming an alpha premultiplied image from each warped image and constructing a band-pass Laplacian pyramid from the alpha premultiplied images. In addition, a low-pass Gaussian pyramid is constructed from each of the previously created weight maps. A new composite band-pass Laplacian pyramid is then computed using the band-pass Laplacian pyramids and low-pass Gaussian pyramids associated with the warped images. This computation includes, for each corresponding level of the pyramids, first multiplying each pixel of each warped image by the weight factor associated with that same pixel location in the corresponding weight map to produce a weighted pixel value. The weighted pixel values for each corresponding pixel location in all the warped images are respectively added together and divided by the sum of the weight factors corresponding with that pixel location. Lastly, the blended image is produced by expanding and summing the pyramid levels of the composite band-pass Laplacian pyramid, and compensating for the previously implemented alpha premultiplication of the warped images.

In regards to the alpha premultiplied, this process involves multiplying the R, G and B components of each warped image pixel by the alpha value associated with that pixel. Thus, the preferred alpha premultiplication compensation step involves dividing the R, G, B components of each pixel of the blended image by its alpha value.

It is also preferred that measures be taken to determine whether the warped images are in registration with one another prior to the blending process. If the images are mis-registered, the blended image quality can suffer. If any unacceptable mis-registration is discovered, the warped images are aligned via conventional methods [SS97, SS98].

In addition, it is preferred that, just prior to compensating for the alpha premultiplication in the blended image, the R, G, B and alpha components of each pixel be clipped by first setting any of these components having a value of less than zero to zero, and secondly setting any of the R, G, and B components having a value greater than alpha to the alpha value. This will compensate for any underflow or overflow caused by the pyramid blending process. It is also desirable that a step be added to the general blending process described previously to ensure any cut-out region common to all the input images maintains a zero alpha value. This is accomplished via the use a logical OR operator following the alpha premultiplication compensation step. Specifically, each pixel of the blended image is compared to a correspondingly located pixel of each of the alpha premultiplied images. Whenever any compared pixel of the blended image coincides with a zero-valued pixel in all of the alpha premultiplied images, it is set to zero no matter what value it obtained during the blending process. Conversely, whenever any compared pixel of the blended image does not coincide with a zero-valued pixel in all of the alpha premultiplied images, it is left unchanged.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing(s) will be provided by the Patent and Trademark Office upon request and payment of the necessary fee.

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 2:
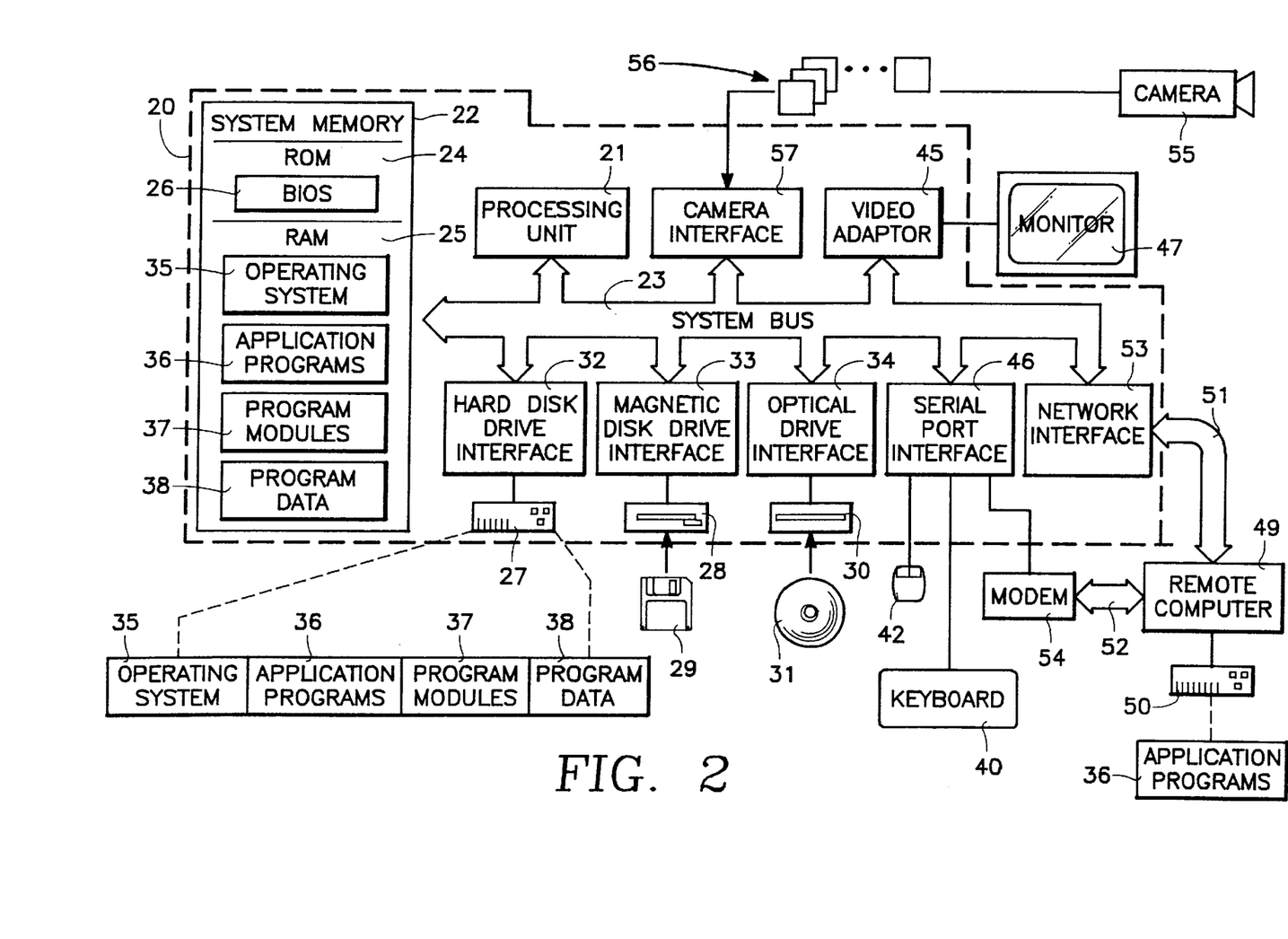
FIG. 2 is a diagram depicting a general purpose computing device constituting an exemplary system for implementing the present invention.

FIG. 2 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining part of this description section will be devoted to a description of the program modules embodying the invention and the testing of these modules.

The general approach to texture map recovery assumes that a 3D model has been reconstructed, preferably using automatic algorithms (e.g., structure from motion) or interactive techniques (e.g., [SHS98]). Given the 3D model and multiple images (possibly taken from different viewpoints) and their associated world-to-camera transformations, texture maps can be extracted that are blended seamlessly from all input images. This process is referred to as inverse texture mapping because the input images are projected (through 3D model) from camera views into the texture view, as opposed to (forward) texture mapping from texture maps (through the 3D model) into the screen view (i.e., a new camera view).

Figure 3:
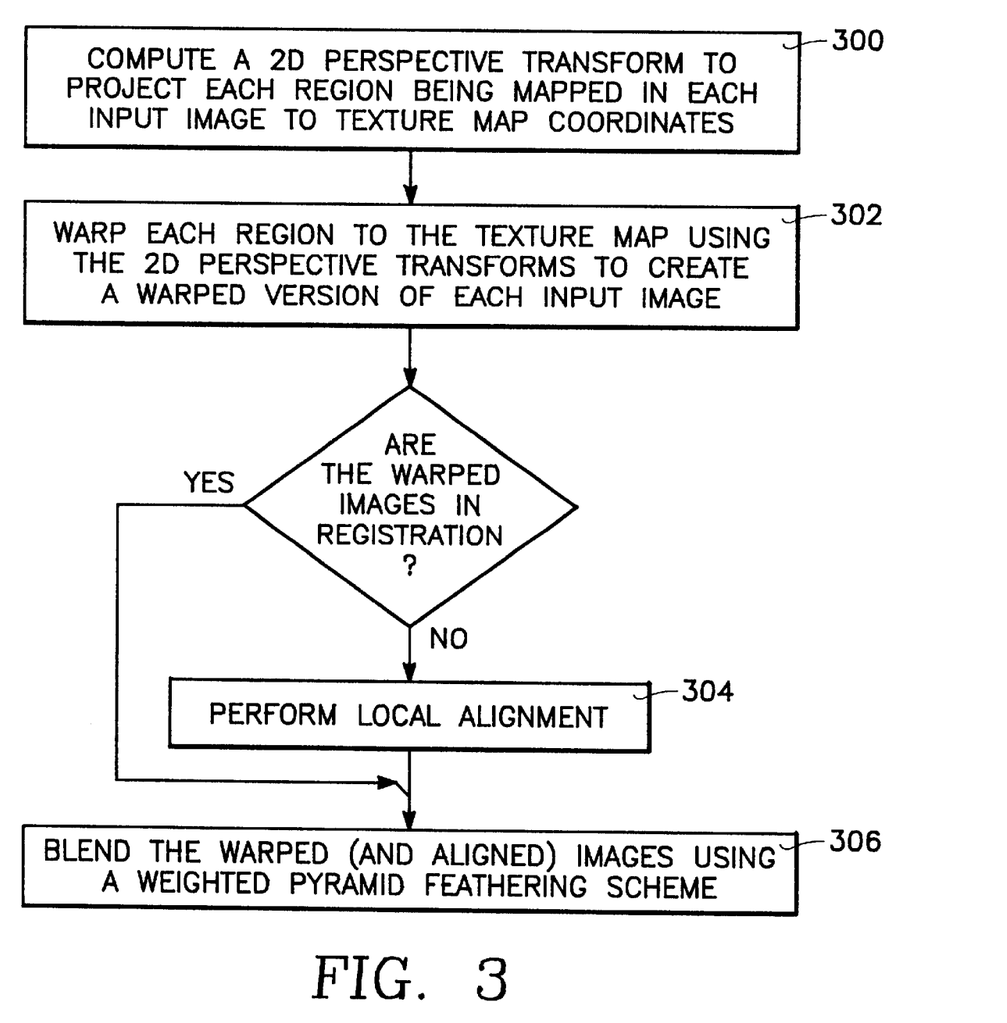
FIG. 3 is a block diagram of an overall process for creating a texture map according to the present invention.

An overview of a preferred inverse texture mapping process embodying the present invention is depicted in FIG. 3. The inverse texture mapping problem is decoupled into one of reconstructing texture maps for any or all planar surfaces (e.g., triangles) in which the 3D model has been divided. For every planar surface in the scene that is to be mapped, the first step 300 in the process is to compute a 2D perspective transform capable of projecting the planar surface from image to texture map coordinates [SS97]. The texture map coordinates (u, v) associated with the vertices of each planar surface are supplied ahead of time, and can either be regular 2D indices (u, v), or 3D homogeneous coordinates (u, v, w), in the case of projective texture maps [SKvW+92]. Each planar surface from each image is then warped via conventional methods using the previously computed 2D perspective transforms to form warped versions of the input images (step 302).

Before the warped images can be blended together, it should be determined whether they are in registration with one another via conventional methods [SS98]. If an unacceptable amount of mis-registration exists, it will be necessary to do local alignment, or "deghosting" [SS98] prior to blending in order to obtain the desired results (step 304). Once any unacceptable mis-registration has been corrected, the warped images are blended using a weighted pyramid feathering scheme (step 306) that will be described in detail later in this description. However, first the weight maps that play an integral part in the blending scheme must be created.

1. Creating Weight Maps

When blending several images to create a texture map, the preferred course of action is to decide how much each image (or more particularly each pixel from each image) contributes to the final texture map. This is accomplished by creating a weight map for each image which dictates on a pixel by pixel basis how much that pixel will contribute to the blended image. These weight maps are then used in the pyramid feathering algorithm as will be described later to create the texture maps. The use of the weight maps for each image facilitates their seamless blending regardless of the differences in sampling (e.g., different viewpoints or different scales) or exposure between the images.

There are many existing weighting schemes that can be adopted for the purpose of producing an acceptable weight map for use with the weighted pyramid feathering process. Two of the more preferred of the existing methods will be presented herein. Namely the binary mask method and the "distance from image contour" method. However, it is not intended to limit the present invention to just embodiments employing these two methods. Rather, any appropriate existing weighting scheme can be employed. For instance, a simple averaging method would be another example of a weighting process that could be employed.

1.1 Binary Masks

The simplest possible weight map is a binary mask that can be associated with each image to dictate which pixels should be used in the texture map and which should not. For each image, a pixel is marked if its distance to its own image center is closer than its distance to any other image center. Otherwise the pixel is not used in blending. This process is similar to constructing the Voronoi diagram of multiple image centers [W+97, PH97]. The binary mask method is particularly effective when images have significant overlaps.

However, when image centers overlap, there are many other choices for the weight map, as well. For example, we can simply choose the left half from one image and the right half from the other image. It should be noted however that these binary masks cannot deal with cut-out regions, nor images taken at different scales.

1.2 Distance from Image Contours

A better heuristic is a weight map which measures the minimum distance of each pixel to the image edges or nearest zero-alpha pixels. In this scheme, the farther a pixel is from the image center, the less important it is. A city-block distance or grassfire transform [RK76] can be used to establish the required distances in this method. Because these distance measures typically weight the center of the image more heavily than edges, it is called a "feather map" when applied to image mosaicing [Sze96, SS97].

The feather map can deal with cut-out regions by simply assigning zero weight to the zero alpha regions. However, a linear feather map (e.g., one employing city-block distance) has an undesirably wide transition zone. To narrow the transition zone, a non-linear feather map $d_1$ can be employed instead. In this scheme, the non-linear feather map $d_1$ is computed from the city-block distance d as $$d_1 = d_{max} * s^2 \tag{1}$$

where $s=0.5*(1.0-\cos(d/d_{max}))$, and $d_{max}$ is the largest city-block distance.

Compared with the Voronoi diagram approach, the non-linear feather map is easier to implement (e.g., no need to check for the Voronoi boundary) and has a more gradual transition.

2. Blending with Weighted Pyramid Feathering

2.1 Burt and Adelson's Pyramid Blending

A pyramid blending technique capable of seamlessly blending two images was previously developed by P. J. Burt and E. H. Adelson [BA83b] (hereinafter referred to as the Burt and Adelson pyramid blending technique). In this technique, two input images are first decomposed into band-pass pyramids (i.e., Laplacian pyramids [BA83a]) which are blended at different levels and then summed back to the finest level to reconstruct a blended image.

To blend two (completely overlapped) images A and B, according to a given mask, the Laplacian pyramid blending works in the following three steps:

a. Construct Laplacian pyramids LA and LB for images A and B, respectively;

b. Construct a new Laplacian pyramid LS by taking the weighted average of LA and LB at every pyramid level using the given mask;

c. Reconstruct a new image S by summing all levels of LS.

A mask needs to be specified at every pyramid level for proper blending. If the mask is only specified at the lowest level, its Gaussian pyramid can be used for the other pyramid levels. The Gaussian pyramid also makes the transition at the mask contour smoother as it tends to widen the transition zone at coarser levels of the pyramid.

Figure 4:
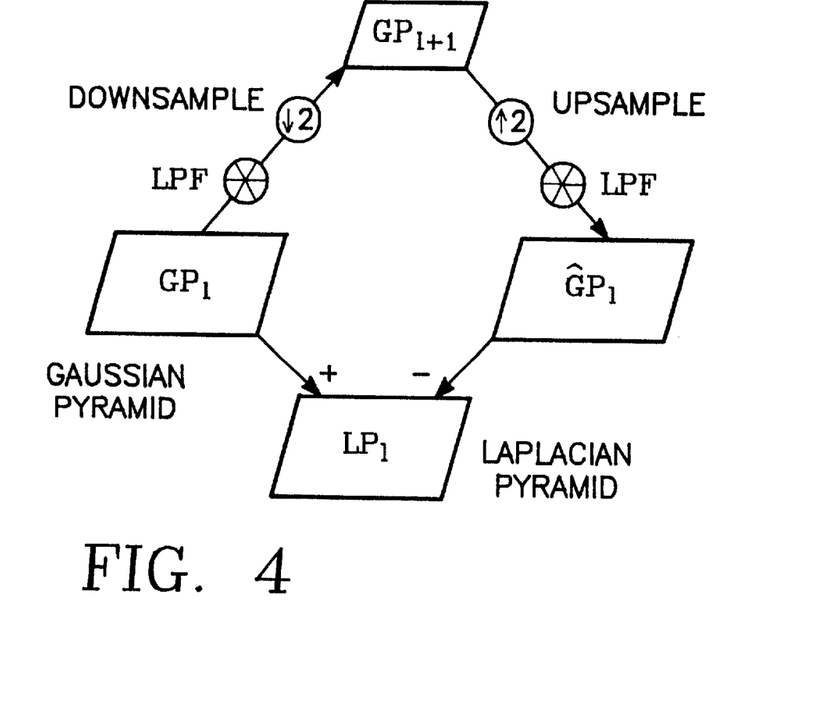
FIG. 4 is a diagram graphically depicting the construction of Gaussian and Laplacian pyramids.

To construct the band pass pyramid for an image, the first step is to construct its low-pass pyramid (Gaussian pyramid). The Gaussian pyramid is obtained by a REDUCE operation which involves low-pass filtering (i.e., convolving with a small weighting kernel such as a vertical and a horizontal $\{1, 4,6,4,1\}/16$ kernel for a 5×5 window) followed by downsampling. A Laplacian pyramid at level l is the difference between the Gaussian pyramid at level l and the expanded Gaussian pyramid at level l (i.e., expanded using an EXPAND operator from level l+1 to l). The aforementioned expansion process involve is upsampling followed by low-pass filtering. FIG. 4 illustrates the construction of the Gaussian and Laplacian pyramids.

2.2 Pyramid Blending with Alpha

When part of an input image is occluded, that part has to be cut out and should not be used to construct the texture map. Images with cut-out regions can be represented by alpha masks where alpha values inside cut-out regions are set to zero.

To blend two images with alpha masks, it is preferable to use alpha premultiplied images (i.e., $\alpha R$, $\alpha G$, $\alpha B$, $\alpha$), instead of (R, G, B, α), as suggested by [PD84] and others. As shown in Blinn's example of downsampling and overlaying [Bli94a], all filtering should be done on alpha premultiplied (associated) colors rather than unmultiplied colors. The use of alpha premultiplied images in the present invention is advantageously employed to construct the aforementioned Laplacian pyramid since the construction and reconstruction of Laplacian pyramid involves a combination of filtering operations (REDUCE, EXPAND, subtraction, etc.). It will be shown that for input images with alpha maps, Laplacian pyramid blending can be easily and correctly applied to all four channels (αR, αG, αB, α).

2.3 Weighted Pyramid Feathering

Figure 5A:
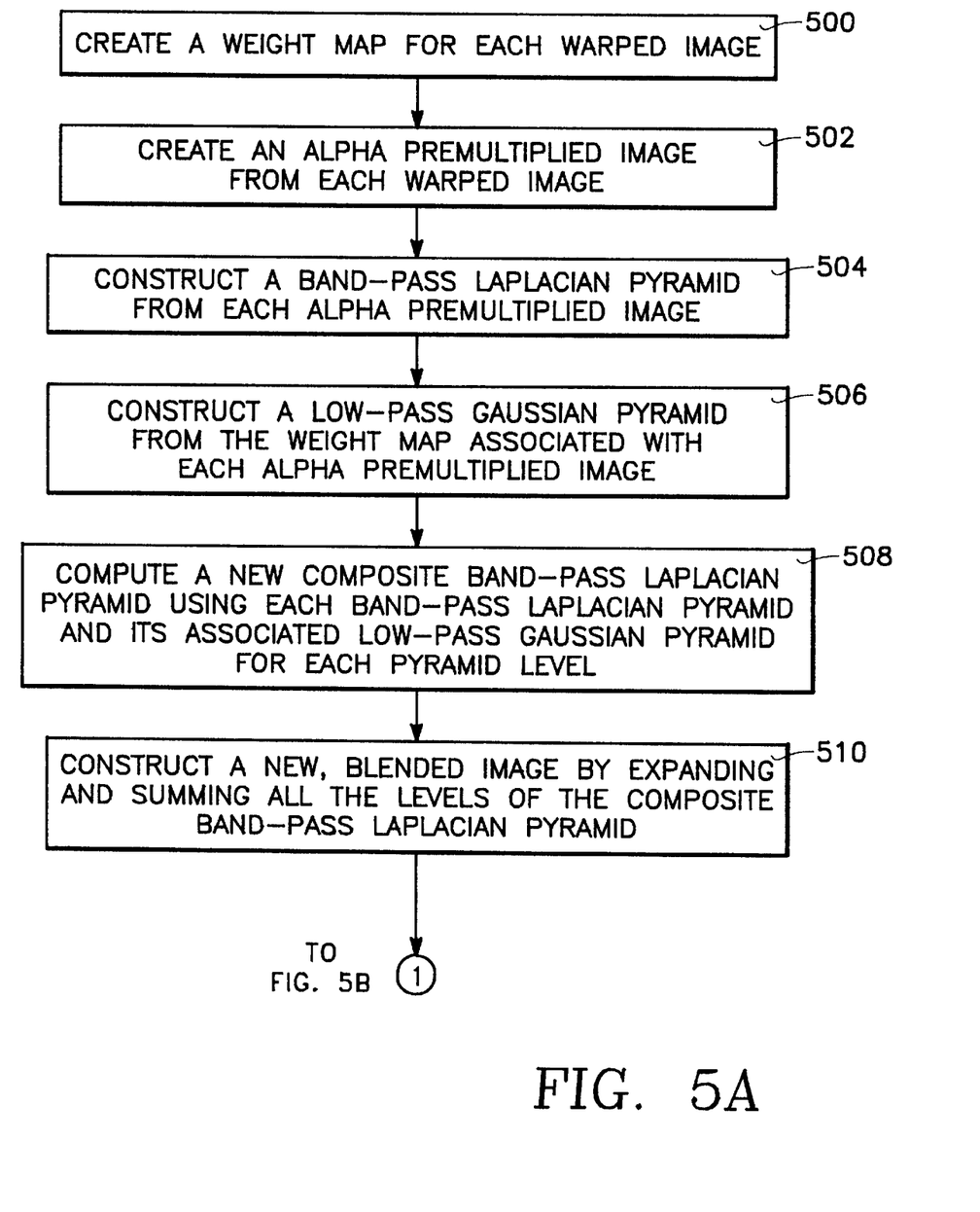
FIGS. 5A and 5B are block diagrams of a process for accomplishing the weighted pyramid feathering blending module of the overall process of FIG. 3.
Figure 5B:
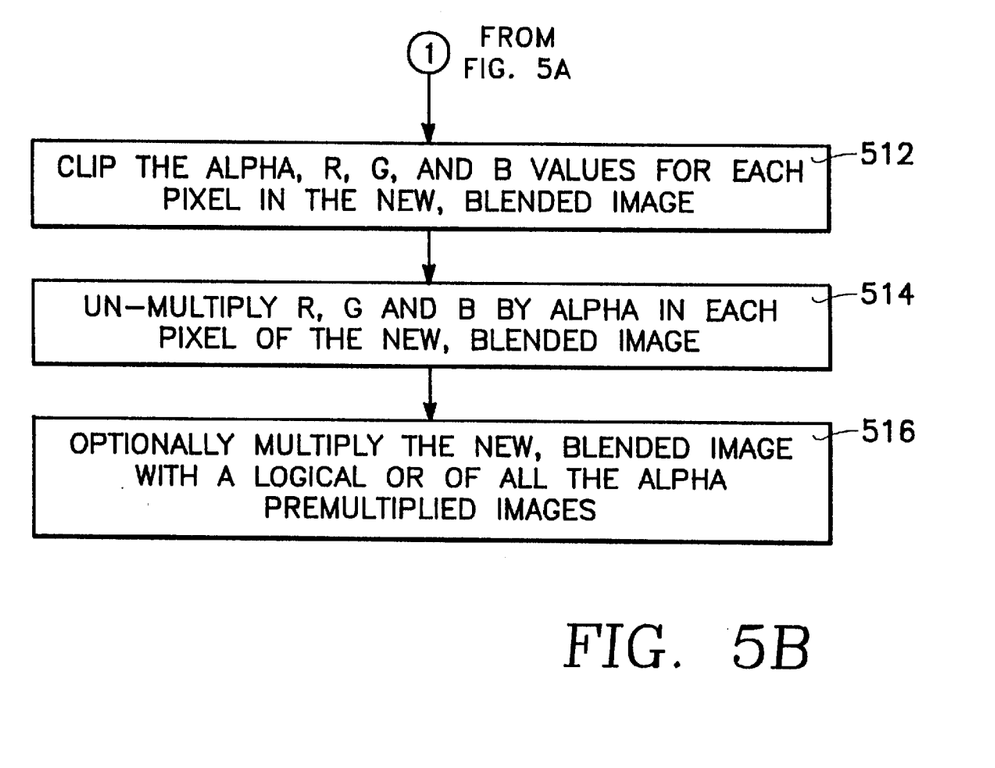

The previously described Burt and Adelson's blending method can be modified to produce a pyramid feathering process embodying the present invention. As illustrated in FIGS. 5A and 5B, this new process includes the steps of:

a) For each warped image k (which is comprised of all the warped planar regions associated with the image):
  (i) create a weight map as described previously (step 500);
  (ii) create an alpha premultiplied image from the warped image k as described previously (step 502);
  (iii) construct a band-pass Laplacian pyramid $L_k$ from the alpha premultiplied image (step 504); and
  (iv) construct a low-pass Gaussian pyramid $w_k$ from the weight map (step 506), including setting $w_k=0$ wherever $α_k=0$.

b) Compute a new composite band-pass Laplacian pyramid LS using each band-pass Laplacian pyramid $L_k$ and its associated low-pass Gaussian pyramid $w_k$ for each pyramid level l, via the following equation (step 508):

$$LS^{(l)}(i,j) = \frac{\sum_k (L_k^{(l)}(i,j) \cdot w_k^{(l)}(i,j))}{\sum_k w_k^{(l)}(i,j)}, \quad l \text{ indexes the pyramid level} \quad (2)$$

where $LS^{(l)}(i,j)$ is set to zero if the sum of all weights of pixel (i, j) at level l is zero.

c) Construct a new, blended image S by expanding and summing all the levels l of the composite band-pass Laplacian pyramid LS (step 510).

At the end of Laplacian reconstruction, there may be overflow and underflow associated with the R, G, B, and/or alpha values. There is no problem that negative alpha values exist at different levels of a band-pass pyramid, but to be able to display the final reconstructed image, alpha should be limited to a number between 0 and 1. It is noted, however, that in practice this range of alpha numbers is typically represented by 8-bit alpha values between 0 and 255. This limiting or clipping operation involves the following (step 512):

a) If α<0, α=0; if R<0, R=0 ; if G<0, G=0; if B<0, B=0; and
b) If R>α, R=α; if G>α, G=α; if B>α, B=α.

Once the clipping operation is complete, the next step 514 is to "un-multiply" R, G, B using the α value (i.e., divide R, G, B by the α value associated with the pixel)

Figure 6A:
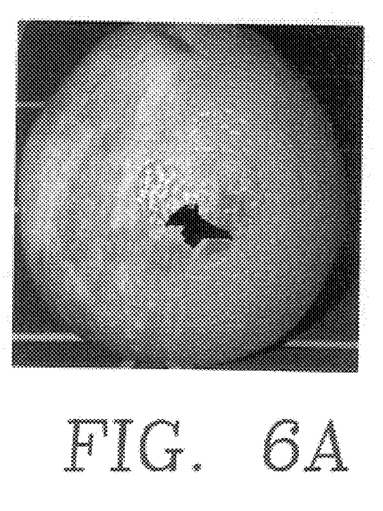
FIGS. 6A and 6B are images depicting the results of the inverse texture mapping process of FIG. 3 shown before the performance of the final logical OR operator step in FIG. 6A and after the performance of the step in FIG. 6B.
Figure 6B:
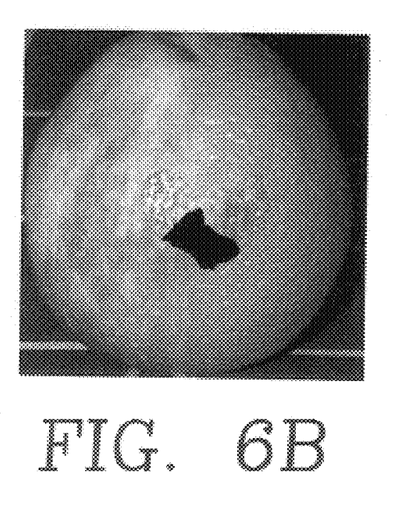

As an optional final step 516, the new image can be multiplied with the logical OR of all the original warped alpha masks, thereby trimming the composite to have non-zero pixels where these exist in all the original images. This final step is necessary if the original alpha map (in particular zero alpha regions) needs to be preserved, because incorrect colors can "bleed" into the zero alpha mask region in the process of Laplacian pyramid reconstruction, as shown in FIG. 6. In operation, if corresponding pixels in all the warped alpha-masked images are assigned a zero value, then the same pixel in the blended image is also assigned a zero value, even if the blending process has produced a pixel value exceeding zero. In this way, any cut-out region common to all the blended images is maintained. Conversely, if any or all of the corresponding pixels in the warped alpha-masked images has a non-zero value, then the pixel value of the blended image is maintained as is.

There are two desired properties when we blend two images with alpha masks. First that image A blended with A is still A; and that image A blended with another image B is A, if B is A with a cut-out mask (zero alpha). The first property is satisfied because the reconstruction of the band-pass pyramid is the same as the original image, and the weights are normalized at all pyramid levels. Unfortunately, second property is generally not satisfied around cut-out contours. However, in practice, the reconstruction error of blending the cut-out image B with its original image A, using the foregoing weighted pyramid feathering process, is so small as to be insignificant. For instance, it has been determined experimentally that a blend of the "rotten" orange (FIG. 7C) with the orange (FIG. 7B), or the "rotten" apple (FIG. 7G) with the apple (FIG. 7D) yields a RMS error of 0.6 gray level (i.e., 0.3% relative to intensity value), which is visually indistinguishable.

3. Tested Embodiments

A computer program embodying many of the aspects of the present invention including the weighted pyramid feathering process was coded in visual C ++ and run on a conventional PC. The program in its coded form is storable on. and can be executed from any appropriate storage medium, such as the hard disk, magnetic disk 29, optical disk 31, ROM 24 or RAM 25 discussed in connection with FIG. 1. The process was applied to a number of images, some of which are detailed below.

Figure 7A:
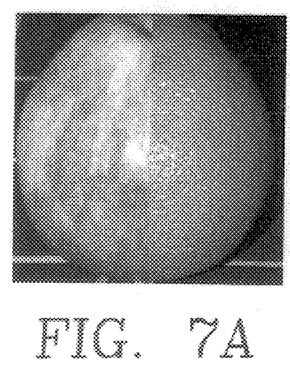
FIGS. 7A through 7I are images depicting apples and oranges, some with occluded regions, and the results of using the inverse texture mapping process of FIG. 3 to blend the images.
Figure 7B:
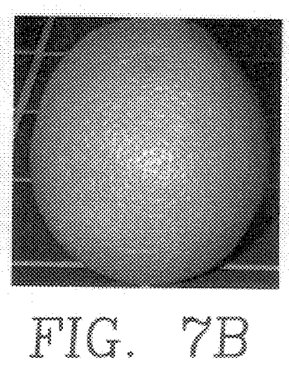

By way of an example, the pyramid feathering algorithm was used to blend the image of an apple and an orange, both of which had cut-out zero alpha masks. For comparison, the left half of the apple and the right half of the orange are shown in FIG. 7A. Notice the distinct seam where the two halves of the images meet. When there is no cut-out mask, the weighted pyramid feathering process produced the image shown in FIG. 7E. Notice that the transition between the apple and orange is almost indistinguishable relative to FIG. 7A. To obtain these striking results, we used weight maps for the apple and the orange as follows, $$w_{apple}(j) = \begin{cases} 1 & \text{if } j \leq L/2 \\ e & \text{otherwise} \end{cases} \text{ and } w_{orange}(j) = \begin{cases} 1 & \text{if } j \geq L/2 \\ e & \text{otherwise} \end{cases} \quad (3)$$

where e is a small number (for our examples, we have used 0.1) and L is the image width.

Figure 7C:
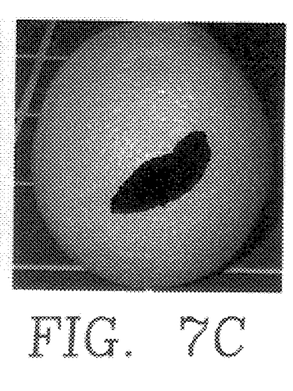
Figure 7D:
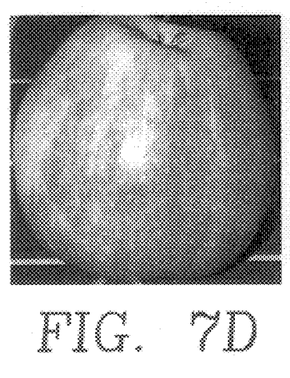
Figure 7E:
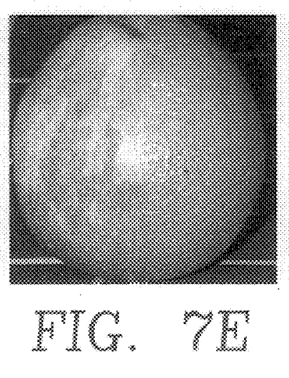
Figure 7F:
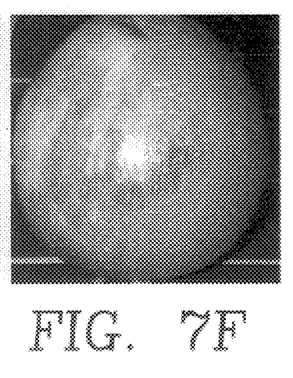
Figure 7G:
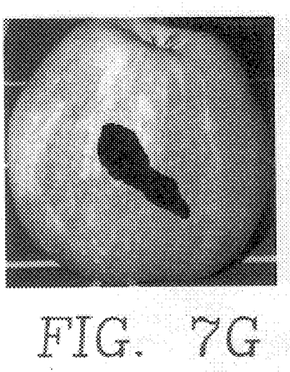
Figure 7H:
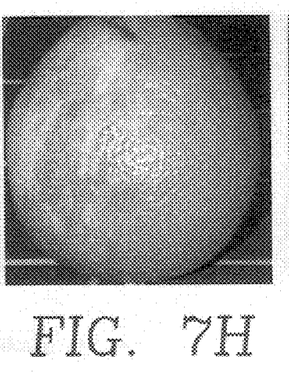

It is also possible to obtain a seamless blending, even with the "rotten" apple and orange images of FIGS. 7C and 7G, respectively, using the weighted pyramid feathering process. The term "rotten" refers to the fact that these images have cut-out regions. As was stated earlier, our method is good at generating texture maps from multiple images even when parts of the images have been cut out. The results of our seamless blending process can be seen in FIG. 7F where the image of the "rotten" orange (FIG. 7C) is blended with the image of the intact apple (i.e., 7D). Similarly, this seamless blending process is illustrated in FIG. 7H where the image of the "rotten" apple (FIG. 7G) is blended with the image of the intact orange (i.e., FIG. 7B).

Figure 7I:
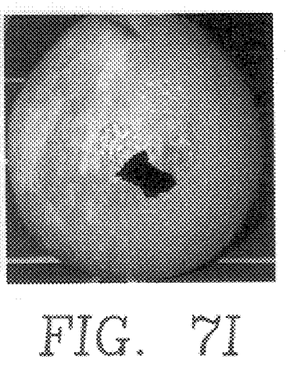

Note that our purpose here is not to fill the hole, nor to synthesize new texture, but to blend two images seamlessly using both the apple and orange images. Thus, as depicted in FIG. 7I, the blending of the images of FIGS. 7C and 7G results in a seamlessly blended image, but one exhibiting a cut-out region. If we wished to fill the hole, we could use another orange image (or part of the same orange image) and blend them together. Other conventional hole-filling methods that could be employed include the noise removal method [HT96], pyramidal texture synthesis method [DB97], and push-pull region-filling method [GGSC96].

Figure 8A:
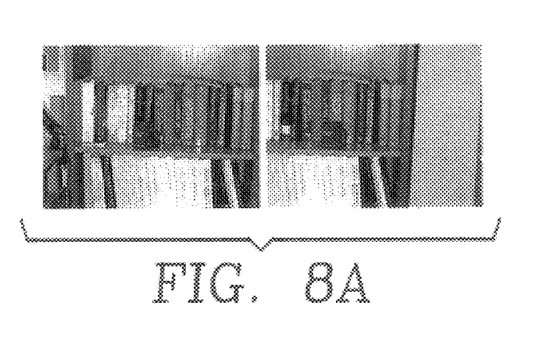
FIGS. 8A through 8D are images depicting a bookshelf used to illustrate the advantages of the inverse texture mapping process of FIG. 3 over conventional feathering schemes when the images being blended have objects which have moved between the time each image was taken.
Figure 8B:
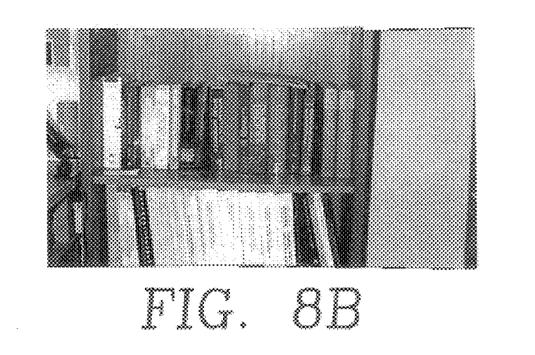
Figure 8C:
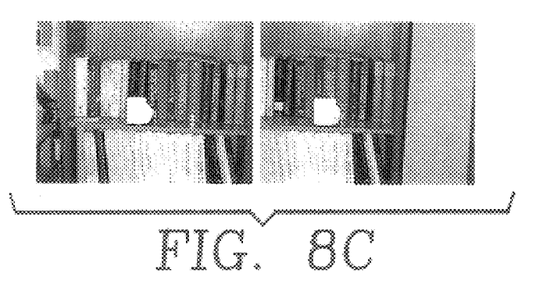
Figure 8D:
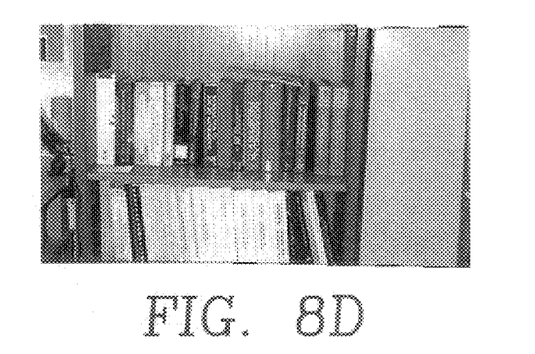

FIGS. 8A–D provide another example where the capability to seamlessly blend images having cut-out regions can be advantageous. FIG. 8A shows two images where a cup has been moved between the time each image was captured. A blended image obtained using a conventional feather blending algorithm exhibits a ghost (or double image) of the cup, as shown in FIG. 8B. To prevent this ghosting problem, the cups can be "cut-out" of each image using an alpha masking process, as shown in FIG. 8C. Applying our weighted pyramid feathering process to the cut-out images in FIG. 8C leads to the seamlessly blended image in FIG. 8D. Notice that the ghost image of the cup seen in FIG. 8B has been eliminated.

Figure 9A:
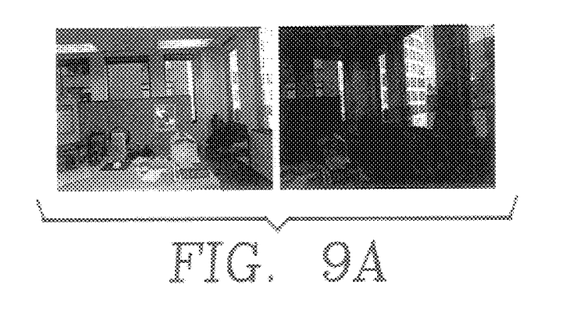
FIGS. 9A through 9D are images depicting the interior of an office used to illustrate the advantages of the inverse texture mapping process of FIG. 3 over conventional averaging and feathering schemes when the images being blended exhibit different exposures.
Figure 9B:
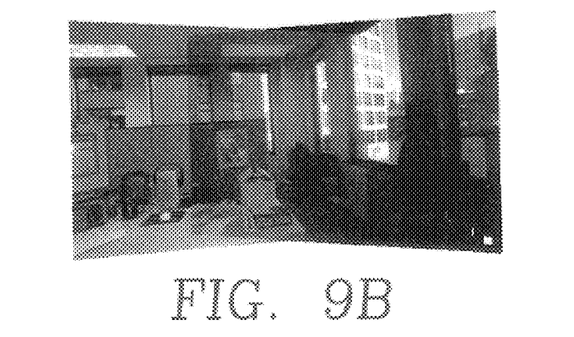
Figure 9C:
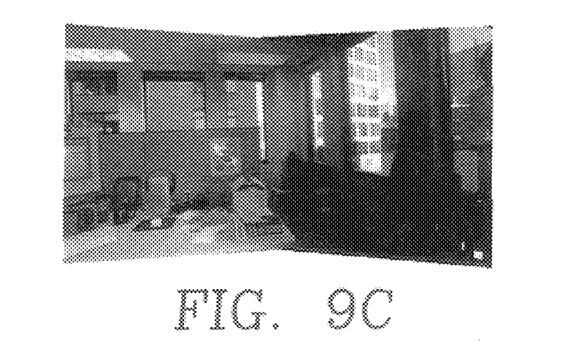
Figure 9D:
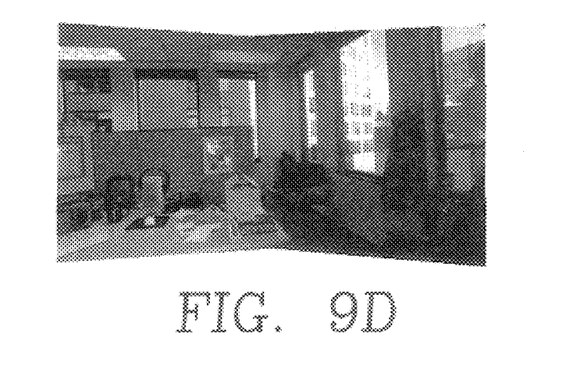

Another key advantage of using the pyramid blending algorithm according to the present invention is that input images having vastly different exposures can be seamlessly blended. FIG. 9A shows two images of the same scene, but with different exposures. FIG. 9B shows the result of using a simple averaging blending method, and FIG. 9C shows the result of using a conventional feathering blending method. The seam between the blended images is quite apparent in the image resulting from the simple averaging methods FIG. 9B). In addition, while somewhat improved, the blended image of FIG. 9C, still exhibits a readily discernable seam at the upper middle part of the composite image. FIG. 9D shows the results of using the weighted pyramid feathering process according to the present invention. As can be seen in this figure, the process results in a seamless mosaic.

REFERENCES

[BA83a] P. J. Burt and E. H. Adelson. The Laplacian pyramid as a compact image code. *IEEE Transactions on Communications*, COM-31(4):532–540, April 1983.

[BA83b] P. J. Burt and E. H. Adelson. A multiresolution spline with applications to image mosaics. *ACM Transactions on Graphics*, 2(4):217–236, October 1983.

[BCS97] C. Bregler, M. Covell, and M. Slaney. Video rewrite: Driving visual speech with audio. *Computer Graphics* (SIGGRAPH'97), pages 353–360, August 1997.

[Bli94a] J. F. Blinn. Jim Blinn's corner: Compositing, part 1: Theory. *IEEE Computer Graphics and Applications*, 14(5):83–87, September 1994.

[Bli94b] J. F. Blinn. Jim Blinn's corner: Compositing, part 2: Practice. *IEEE Computer Graphics and Applications*, 14(6):78–82, November 1994.

[Che95] S. E. Chen. QuickTime VR—an image-based approach to virtual environment navigation. *Computer Graphics* (SIGGRAPH'95), pages 29–38, August 1995.

[DB97] J. De Bonet. Multiresolution sampling procedure for analysis and synthesis of texture images. *Computer Graphics* (SIGGRAPH'97), pages 361–368, August 1997.

[DTM96] P. E. Debevec, C. J. Taylor, and J. Malik. Modeling and rendering architecture from photographs: A hybrid geometry- and image-based approach. *Computer Graphics* (SIGGRAPH'96), pages 11–20, August 1996.

[Fau93] O. Faugeras. *Three-dimensional computer vision: A geometric viewpoint.* MIT Press, Cambridge, Mass. 1993.

[GGSC96] S. J. Gortler, R. Grzeszczuk, R. Szeliski, and M. F. Cohen. The lumigraph. In *Computer Graphics Proceedings, Annual Conference Series*, pages 43–54, Proc. SIGGRAPH'96 (New Orleans), August 1996. ACM SIGGRAPH.

[GH86] N. Greene and P. Heckbert. Creating raster Omnimax images from multiple perspective views using the elliptical weighted average filter. *IEEE Computer Graphics and Applications*, 6(6):21–27, June 1986.

[Hec86] P. Heckbert. Survey of texture mapping. *IEEE Computer Graphics and Applications*, 6(11):56–67, November 1986.

[HT96] A. N. Hirani and T. Totsuka. Combining frequency and spatial domain information for-fast interactive image noise removal. *Computer Graphics* (SIGGRAPH96), pages 269–276, August 1996.

[MB95] L. McMillan and G. Bishop. Plenoptic modeling: An image-based rendering system. Computer Graphics (SIGGRAPH'95), pages 39–46, August 1995.

[PD84] T. Porter and T. Duff. Compositing digital images. *Computer Graphics* (SIGGRAPH'84), 18(3):253–259, July 1984.

[Pel81] S. Peleg. Elimination of seams from photomosaics. In *Proceedings of the Conference on Pattern Recognition and Image Processing*, pages 426–429, Dallas, Tex., August 1981.

[PH97] S. Peleg and J. Herman. Panoramic mosaics by manifold projection. In *IEEE Computer Society Conference on Computer Vision and Pattern Recognition* (CVPR'97),. pages 338–343, San Juan, Puerto Rico, June 1997.

[RK76] A. Rosenfeld and A. C. Kak. *Digital Picture Processing.* Academic Press, New York, N.Y. 1976.

[SB96] A. R. Smith and J. F. Blinn. Blue screen matting. In *Computer Graphics Proceedings, Annual Conference Series*, pages 259–268, Proc. SIGGRAPH'96 (New Orleans), August 1996. ACM SIGGRAPH.

[SKvW+92] M. Segal, C. Korobkin, R. van Widenfelt, J. Foran, and P. Haeberli. Fast shadows and lighting effects using texture mapping. *Computer Graphics* (SIGGRAPH92), pages 249–252, July 1992.

[SHS98] H.-Y. Shum, M. Han and R. Szeliski. Interactive construction of 3D models from panoramic mosaics. In *IEEE Computer Society Conference on Computer Vision and Pattern Recognition* (CVPR'98), pages 427–433, Santa Barbara, June 1998.

[SS97] R. Szeliski and H.-Y. Shum. Creating full view panoramic image mosaics and texture-mapped models. *Computer Graphics* (SIGGRAPH97), pages 251–258, August 1997.

[SS98] H.-Y. Shum and R. Szeliski. Construction and refinement of panoramic mosaics with global and local alignment. In *Sixth International Conference on Computer Vision* (ICCV98), pages 953–958, Bombay, January 1998.

[Sze96] R. Szeliski. Video mosaics for virtual environments. *IEEE Computer Graphics and Applications*, pages 22–30, March 1996.

[W+97] D. N. Wood et al. Multiperspective panoramas for cel animation. In *Computer Graphics Proceedings, Annual Conference Series*, pages 243–250, Proc. SIGGRAPH'97 (Los Angeles), August 1997. ACM SIGGRAPH.

[Wil83] L. Williams. Pyramidal parametrics. *Computer Graphics*, 17 (3): Jul. 1–11, 1983.

[Wol90] G. Wolberg. Digital Image Warping. IEEE Computer Society Press, Los Alamitos, Calif. 1990.

What is claimed is:

1. A computer-implemented process for inverse texture mapping using a weighted pyramid feathering scheme, comprising using a computer to perform the following steps:

inputting at least two images of a 3D scene;

setting any pixel of an inputted image located in a cut-out region of the image to a zero alpha value;

identifying corresponding regions of the 3D scene which are to be texture mapped in each inputted image;

computing a 2D perspective transform for each identified region of each inputted image, said transform being capable of projecting the associated region to prescribed texture map coordinates;

warping each identified region from the inputted images to the prescribed texture map coordinates using the 2D perspective transforms to create plurality of warped images;

creating a weight map for each warped image that specifies the degree to which each pixel in a particular warped image is to contribute to a blended image;

blending the warped images using the weight maps.

2. The process of claim 1, wherein prior to the step of blending the warped images, the process comprises performing the steps of:

determining whether the warped images are in registration with one another;

aligning the warped images whenever it is determined they are not in registration.

3. The process of claim 1, wherein the step of blending the warped images comprises the steps of:

forming an alpha premultiplied image from each warped image;

constructing a band-pass Laplacian pyramid from each alpha premultiplied image, wherein each Laplacian pyramid comprises a prescribed number of pyramid levels;

constructing a low-pass Gaussian pyramid from each of the previously created weight maps associated with each warped image, wherein each Gaussian pyramid comprises the same number of pyramid levels as each Laplacian pyramid;

computing a new composite band-pass Laplacian pyramid using the band-pass Laplacian pyramids and low-pass Gaussian pyramids associated with the warped images;

producing a blended image by expanding and summing the pyramid levels of the composite band-pass Laplacian pyramid; and compensating for the alpha premultiplication associated with the step of forming the alpha premultiplied image of each warped image.

4. The process of claim 3, wherein the step of computing the new composite band-pass Laplacian pyramid comprises the steps of:

for each corresponding pyramid level of the band-pass Laplacian pyramids and the low-pass Gaussian pyramids, multiplying the pixel at each pixel location of each of the warped images by a weight factor associated with the same pixel location in the weight map associated with the warped image to produce a weighted pixel value, summing the weighted pixel values for each correspondingly pixel location of all the warped image, and dividing the summed weighted pixel value associated with a pixel location by the sum of the weight factors corresponding with that pixel location in each weight map to create a portion of the blended image, except whenever the sum of the weight factors for a pixel is equal to zero, that pixel is set to zero.

5. The process of claim 1, wherein the step of forming an alpha premultiplied image from each warped image comprises the step of multiplying R, G and B components of each warped image pixel, which along with an alpha component define each warped image pixel, by the alpha value associated with the particular pixel being multiplied, and wherein the alpha premultiplication compensation step comprises dividing R, G, B components of each pixel of the blended image, which along with an alpha component define each blended image pixel, by the alpha value associated with the particular pixel being divided.

6. The process of claim 5, further comprising, prior to the alpha premultiplication compensation step, the steps of:

respectively clipping the R, G, B and alpha components of each pixel in the blended image by first setting any of said components having a value of less than zero to zero, and secondly setting any of the R, G, and B components having a value greater than the alpha value of the pixel being clipped to the alpha value.

7. The process of claim 3, further comprising, following the alpha premultiplication compensation step, the steps of:

comparing each pixel of the blended image to a correspondingly located pixel of each of the alpha premultiplied images;

setting any compared pixel of the blended image to zero whenever it coincides with a zero-valued pixel in all of the alpha premultiplied images; and leaving any compared pixel of the blended image unchanged whenever it does not coincide with a zero-valued pixel in all of the alpha premultiplied images.

8. A system for inverse texture mapping using a weighted pyramid feathering scheme, comprising:

a general purpose computing device;

a computer program comprising program modules executable by the computing device, wherein the computing device is directed by the program modules of the computer program to, input at least two images of a 3D scene, set any pixel of an inputted image located in a cut-out region of the image to a zero alpha value, identify corresponding regions of the 3D scene which are to be texture mapped in each inputted image, compute a 2D perspective transform for each identified region of each inputted image, said transform being capable of projecting the associated region to prescribed texture map coordinates, warp each identified region from the inputted images to the prescribed texture map coordinates using the 2D perspective transforms to create plurality of warped images, create a weight map for each warped image that specifies the degree to which each pixel in a particular warped image. is to contribute to a blended image, and blend the warped images using the weight maps.

9. The system of claim 8, wherein the computer program further comprises program modules, executable prior to the execution of the program module for blending the warped images, for:

determining whether the warped images are in registration with one another; and aligning the warped images whenever it is determined they are not in registration.

10. The system of claim 8, wherein the program module for blending the warped images comprises sub-modules for:
forming an alpha premultiplied image from each warped image;
constructing a band-pass Laplacian pyramid from each alpha premultiplied image, wherein each Laplacian pyramid comprises a prescribed number of pyramid levels;
constructing a low-pass Gaussian pyramid from each of the previously created weight maps associated with each warped image, wherein each Gaussian pyramid comprises the same number of pyramid levels as each Laplacian pyramid;
computing a new composite band-pass Laplacian pyramid using the band-pass Laplacian pyramids and low-pass Gaussian pyramids associated with the warped images;
producing a blended image by expanding and summing the pyramid levels of the composite band-pass Laplacian pyramid; and
compensating for the alpha premultiplication associated with the step of forming the alpha premultiplied image of each warped image.

11. The system of claim 10, wherein the sub-module for computing the new composite band-pass Laplacian pyramid comprises sub-modules for:
at each corresponding pyramid level of the band-pass Laplacian pyramids and the low-pass Gaussian pyramids,
multiplying the pixel at each pixel location of each of the warped images by a weight factor associated with the same pixel location in the weight map associated with the warped image to produce a weighted pixel value,
summing the weighted pixel values for each corresponding pixel location of all the warped image, and
dividing the summed weighted pixel value associated with a pixel location by the sum of the weight factors corresponding with that pixel location in each weight map to create a portion of the blended image, except whenever the sum of the weight factors for a pixel is equal to zero, that pixel is set to zero.

12. The system of claim 8, wherein the sub-module for forming the alpha premultiplied image from each warped image comprises a sub-module for multiplying R, G and B components of each warped image pixel, which along with an alpha component define each warped image pixel, by the alpha value associated with the particular pixel being multiplied, and wherein the alpha premultiplication compensation sub-module comprises a sub-module for dividing R, G, B components of each pixel of the blended image, which along with an alpha component define each blended image pixel, by the alpha value associated with the particular pixel being divided.

13. The system of claim 12, further comprising a sub-module, executable prior to the alpha premultiplication compensation sub-module, for respectively clipping the R, G, B and alpha components of each pixel in the blended image by first setting any of said components having a value of less than zero to zero, and secondly setting any of the R, G, and B components having a value greater than the alpha value of the pixel being clipped to the alpha value.

14. The system of claim 10, further comprising sub-modules, executable following the alpha premultiplication compensation sub-module, for:
comparing each pixel of the blended image to a correspondingly located pixel of each of the alpha premultiplied images;
setting any compared pixel of the blended image to zero whenever it coincides with a zero-valued pixel in all of the alpha premultiplied images; and
leaving any compared pixel of the blended image unchanged whenever it does not coincide with a zero-valued pixel in all of the alpha premultiplied images.

15. A computer-readable memory for causing a computer to perform inverse texture mapping using a weighted pyramid feathering scheme, comprising:
a computer-readable storage medium; and
a computer program comprising program modules stored in the storage medium, wherein the storage medium is so configured by the computer program that it causes the computer to,
input at least two images of a 3D scene,
set any pixel of an inputted image located in a cut-out region of the image to a zero alpha value,
identify corresponding regions of the 3D scene which are to be texture mapped in each inputted image,
compute a 2D perspective transform for each identified region of each inputted image, said transform being capable of projecting the associated region to prescribed texture map coordinates,
warp each identified region from the inputted images to the prescribed texture map coordinates using the 2D perspective transforms to create plurality of warped images,
create a weight map for each warped image that specifies the degree to which each pixel in a particular warped image is to contribute to a blended image, and
blend the warped images using the weight maps.

16. The computer-readable memory of claim 15, wherein the computer program further comprises program modules, executable prior to the execution of the program module for blending the warped images, for:
determining whether the warped images are in registration with one another; and
aligning the warped images whenever it is determined they are not in registration.

17. The computer-readable memory of claim 15, wherein the program module for blending the warped images comprises sub-modules for:
forming an alpha premultiplied image from each warped image;
constructing a band-pass Laplacian pyramid from each alpha premultiplied image, wherein each Laplacian pyramid comprises a prescribed number of pyramid levels;
constructing a low-pass Gaussian pyramid from each of the previously created weight maps associated with each warped image, wherein each Gaussian pyramid comprises the same number of pyramid levels as each Laplacian pyramid;
computing a new composite band-pass Laplacian pyramid using the band-pass Laplacian pyramids and low-pass Gaussian pyramids associated with the warped images;
producing a blended image by expanding and summing the pyramid levels of the composite band-pass Laplacian pyramid; and
compensating for the alpha premultiplication associated with the step of forming the alpha premultiplied image of each warped image.

18. The computer-readable memory of claim 17, wherein the sub-module for computing the new composite band-pass Laplacian pyramid comprises sub-modules for:
- at each corresponding pyramid level of the band-pass Laplacian pyramids and the low-pass Gaussian pyramids,
  - multiplying the pixel at each pixel location of each of the warped images by a weight factor associated with the same pixel location in the weight map associated with the warped image to produce a weighted pixel value,
  - summing the weighted pixel values for each corresponding pixel location of all the warped image, and
  - dividing the summed weighted pixel value associated with a pixel location by the sum of the weight factors corresponding with that pixel location in each weight map to create a portion of the blended image, except whenever the sum of the weight factors for a pixel is equal to zero, that pixel is set to zero.

19. The computer-readable memory of claim 15, wherein the sub-module for forming the alpha premultiplied image from each warped image comprises a sub-module for multiplying R, G and B components of each warped image pixel, which along with an alpha component define each warped image pixel, by the alpha value associated with the particular pixel being multiplied, and wherein the alpha premultiplication compensation sub-module comprises a sub-module for dividing R, G, B components of each pixel of the blended image, which along with an alpha component define each blended image pixel, by the alpha value associated with the particular pixel being divided.

20. The computer-readable memory of claim 19, further comprising a sub-module, executable prior to the alpha premultiplication compensation sub-module, for respectively clipping the R, G, B and alpha components of each pixel in the blended image by first setting any of said components having a value of less than zero.to zero, and secondly setting any of the R, G, and B components having a value greater than the alpha value of the pixel being clipped to the alpha value.

21. The computer-readable memory of claim 17, further comprising sub-modules, executable following the alpha premultiplication compensation sub-module, for:
- comparing each pixel of the blended image to a correspondingly located pixel of each of the alpha premultiplied images;
- setting any compared pixel of the blended image to zero whenever it coincides with a zero-valued pixel in all of the alpha premultiplied images; and
- leaving any compared pixel of the blended image unchanged whenever it does not coincide with a zero-valued pixel in all of the alpha premultiplied images.

* * * * *